Nov. 17, 1970     W. YOGUS ET AL     3,540,102
POSITIVE RAKE INSERT HOLDER
Filed Jan. 15, 1968
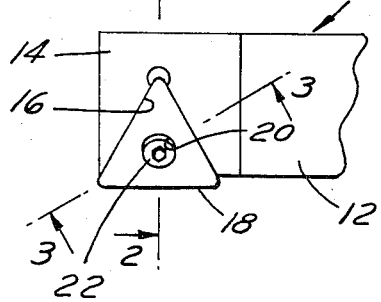
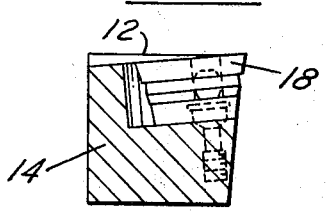
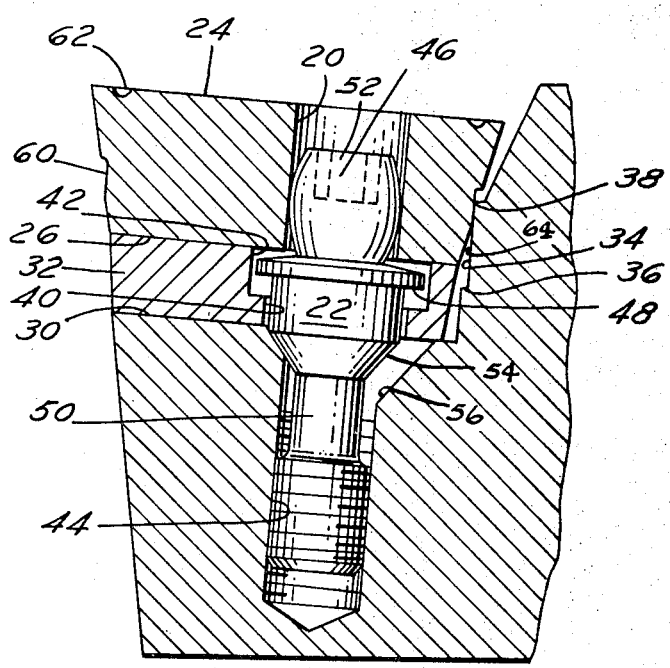
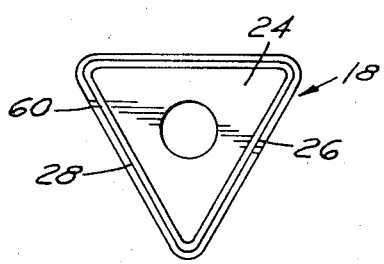
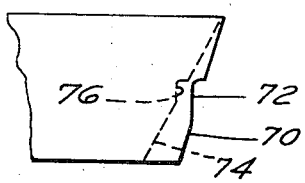
INVENTOR
WILLIAM YOGUS
BY JACK O. SULLIVAN
ATTORNEYS

United States Patent Office 3,540,102
Patented Nov. 17, 1970

3,540,102
POSITIVE RAKE INSERT HOLDER
William Yogus, Birmingham, and Jack O. Sullivan, Farmington, Mich., assignors to The Valeron Corporation, a corporation of Michigan
Filed Jan. 15, 1968, Ser. No. 697,832
Int. Cl. B26d 1/00
U.S. Cl. 29—96                                     4 Claims

ABSTRACT OF THE DISCLOSURE

A positive rake cutting tool including a holder for a cutting insert having an inclined side wall form and wherein a side form locking arrangement is provided within the side wall form of the insert for interengagement with the back wall of the insert seat on the holder to enable the use of a straight walled center hole in the insert and center pin wedge-locking means therewithin.

BACKGROUND OF THE INVENTION

Negative rake cutting tools which use replaceable and indexable cutting inserts include a holder which has an insert seat inclined at a negative rake angle relative to the cutting plane and an insert which has a straight side wall form, since the inclination of the insert seat assures clearance under the cutting edge. The inclination of the insert seat relative to the cutting plane also causes an overhanging back wall pocket to be provided on the holder which enables the use of center holes in the inserts and means in the center holes for wedge-locking the inserts in the pockets and retaining them on the holders.

Positive rake cutting tools, on the other hand, have the insert seat inclined oppositely and in such a manner that the inserts are required to have an inclined side wall form, to provide clearance under the cutting edge, and the back wall of the insert seat must be inclined rearwardly to complement the side wall form of the insert. This provides a ramp surface rather than a pocket at the back wall of the insert seat and has required the use of an external type clamp, extending over the insert, to hold it on its seat.

Although efforts have been made to eliminate the overhanging type external clamp in positive rake cutting tools none have proven too successful. Hybrid forms of the insert, to provide an oppositely inclined back wall and enable use of center hole retainer means are too costly to make. Inserts with enlarged center holes to provide a shoulder form or taper for a recessed clamping means require too great a reduction in material strength behind the cutting edge. And inserts disposed at a negative rake angle but formed to include a positive rake cutting edge are similarly unsatisfactory.

Heretofore, all efforts have been directed towards changes in the form of the insert or means that will provide a shoulder lock in a center hole in the inserts to enable holding it more securely on its seat. No one has considered the possibility of a side form locking arrangement, between the side walls of the insert and the back wall of the holder, because of its rearwardly inclined disposition. However, as will hereafter be shown and described, such a side form locking arrangement is possible and requires no major change in the form of either the insert or the holder to accomplish the desired objectives.

SUMMARY OF THE INVENTION

This invention relates to positive rake cutting tools and more particularly to the side wall form of the inserts and holders whereby conventionally known center hole clamping arrangements may be used to secure inserts with inclined side walls on the cutting tool holders.

Basically, the positive rake type inserts of this invention include the conventionally known inclined side wall form and are used with holders having the back wall of the insert seat generally complementary thereto. However, the side walls of the insert and the receptive back wall of the holder are formed to provide interengaging surfaces therewithin having an inclination which provides a side wall locking form that enables the use of a center pin in a straight wall hole in the insert and other like internal clamping means therewith.

In one of the preferred forms of this invention, the inclined side walls of a positive rake type insert are formed to include a negative rake land between the upper and lower side wall edges thereof which extends laterally across each side wall and circumferentially around the insert. The back wall of the holder over the insert seat, or converging back walls thereof, is in turn formed to include a like or near complementary shoulder surface for engagement with the land on the insert. The negative angular inclination of the locking land on the insert is not pronounced but rather in the order of one or two degrees and the rake angle on the back wall of the holder is similarly slight and preferably with only tolerance dimensions greater than the rake angle on the insert side walls.

The locking land, or like shoulder form, is preferably disposed within the side wall form of a positive rake insert, rather than projecting therebeyond, and is sufficiently spaced below the cutting edge, and is of such minimal depth, as to have no adverse effect on the strength of the cutting edge. It is also preferably spaced relatively over the plane of the center pin retaining pressure to obtain a moment couple which serves to hold the outer disposed lower face of the insert on the insert seat.

Although the detailed description of a preferred embodiment of this invention, following hereafter, lays principal emphasis on having a negative rake land on the positive rake inserts, the full scope of the invention extends to any and all side form locking arrangements for positive rake inserts and positive rake insert holders, as conventionally known and as distinguished from the hybrid types that have been mentioned. These include, but are not limited to, grooves, notches, shoulders, beads and like means, in one or the other of the cooperating insert and holder walls, and which provide a side wall locking or retaining interaction therebetween in whatsoever form.

DESCRIPTION OF THE DRAWING

FIG. 1 is a top plan view of a positive rake cutting tool with the insert retained by the side form locking arrangement of the present invention.

FIG. 2 is a cross sectional view through the cutting tool holder shown in the first drawing figure in the plane of line 2—2.

FIG. 3 is an enlarged cross sectional view through the insert and holder as seen in the plane of line 3—3 in the first drawing figure, through the axis of the insert and its holder seat.

FIG. 4 is a perspective of a triangular insert made in accord with the teachings of this invention.

FIG. 5 is a bottom plan view of the insert shown in the last mentioned drawing figure.

FIG. 6 is a fragmentary corner of a positive rake insert having a lesser rake angle than shown in the other drawing figures.

DETAILED DESCRIPTION

The cutting tool 10 shown in the drawings includes a holder 12 having a head portion 14 formed to include a pocket 16 for a triangular shaped cutting insert 18. The tool holder head is formed to dispose a cutting edge of the insert at a positive rake angle and the insert 18 itself is of the positive rake type having an inclined side wall form. The insert also includes a center hole 20 within which is provided a locking pin 22 to hold it on the holder and in engagement with the side walls of the insert pocket.

As shown by FIG. 3, the insert includes parallel spaced end wall faces 24 and 26 and like angularly inclined side walls 28. The insert pocket 16 includes an insert seat 30, on which is provided an anvil or shim seat member 32, and a shoulder wall 34 which extends to substantially the height of the insert over the shim seat member. The shoulder wall includes a shoulder 36 next to the shim seat member, for keeping it aligned, and another protrusion 38 next to the insert, and later described, but is otherwise generally inclined at an angle relatively complementary to that of the side wall form of the insert 18.

The center hole 20 through the insert is a straight bore normal to the end wall faces 24 and 26 of the insert and is spaced equidistantly from the side walls 28. The shim seat member 32 includes a like hole 40 enlarged, as at 42, near the side receiving the insert, and both holes are disposed for alignment over a threaded hole 44 below the insert seat 30 and in the holder.

The locking pin 22 is of the tilt pin type and has a bulbular end 46 received in the insert hole, a shouldered portion 48 received in the enlarged part 42 of the shim seat hole, and a lower shank end 50 having threaded engagement in the holder hole 44. The head 46 of the tilt pin has relatively colse fitted engagement within the insert hole 20 and bearing engagement therewith nearer to the bottom wall face 26 than the plane of the cutting edges; which is also the upper wall face 24. The shouldered portion 48 on the center tilt pin member keeps the shim seat member 32 on the holder when the locking pin is loosened, to change or index a cutting insert.

The locking pin 22 includes a socket recess 52 in its upper end, by means of which it may be tightened down and loosened on the holder, and has a conical shoulder 54 for engagement with a conical wall 56 eccentrically disposed relative to the center pin hole 44 in the tool holder to cause the pin to deflect laterally towards the locking walls 34 of the holder. With the type holder shown, the deflection of the center pin is towards the apex of the insert pocket 16 but it will be appreciated that with a single back wall type holder the deflection would be normal to it.

As is well known, the center pin is not deformed in being deflected laterally but is only deflected within elastic limits and readily recovers when the deflecting pressure is released.

Referring now to the positive rake insert 18 in greater detail, and having reference to FIGS. 4 and 5, it will be noted that a groove or insert provides a land 60 laterally across each of the insert side walls, between the top and bottom wall faces 24 and 26, and circumferentially around the insert. The relief provided within the inclined side wall form of the insert is well below the cutting edge or lip 62 of the insert and the amount of metal removed is so slight as to have no adverse effect on its cutting strength.

The land 60 is best shown in FIG. 3 to provide a plane surfaced shoulder wall having a negative angular inclination with respect to the positive angular inclination of the side form of the insert and one which cooperates with a like negative angle plane surface side form 64 on the back wall 34 of the holder on the underside of the shoulder wall protrusion 38. The negative angular inclination of the land 60 need be no more than 1° and the cooperating shoulder wall form 64 on the holder is preferably of a like minimum angular inclination with only tolerance dimension differences thereover. As engaged together, a reactionary force vector is established parallel to the insert seat and also down and normal thereto. The locking pin 22 also produces vector forces parallel and normal to the insert seat and in combination the vector forces which are parallel to the insert seat provide a force couple which acts to hold the forward end of the insert down and further assures positive seating of the insert on the holder.

The relief to provide the negative angular land on an insert is relatively slight for both light and heavy duty inserts. As shown in FIG. 6, a positive rake insert 70 with a lesser rake angle will obtain a longer land 72, assuring greater holding power, than a lesser rake angle side form 74 having a land 76 provided therein, with relatively the same depth of cut. In both instances the reduction in wall thickness under the cutting edge is so slight and so removed from the cutting edge as to have no adverse effect.

Although other side form locking means may be provided, than the cooperating lands on the insert and holder walls, or wall, this is the preferred form because of its simplicity and the absence of stress points that more pronounced notches or reversed shoulder wall forms might provide. No greater or lesser angular inclination in the side wall form of the insert is necessary for cutting clearances and the form is simple enough to be cast in the inserts when they are made.

Any of the numerous types of tilt pin arrangements used with negative rake inserts may be used to obtain the center pin lock and avoid the use of external clamps.

We claim:

1. A positive rake cutting tool comprising; a holder, a polygonal cutting insert having parallel faces, a cutting insert side wall forming an acute angle with one of said faces of said cutting insert, an intermediate surface of said side wall substantially spaced from both of said parallel faces and having less angularity relative thereto, a pocket in said holder having a side wall surface complementary to said intermediate surface adapted for interengagement therewith, a seat in said pocket engaging the other of said faces, a hole through said insert, pin means in said hole applying a force to said insert in a plane substantially parallel to said faces, reaction force applied by said pocket side wall to said insert extending in a second plane parallel to said faces and relatively spaced from said first plane, the couple resultant from said forces tending to establish pressure engagement of said insert with said seat over a portion of said insert most remote said surfaces.

2. The cutting tool of claim 1, wherein said surfaces extend at a slightly acute angle relative to said seat.

3. A positive rake polygonal cutting insert having parallel faces, side walls forming acute angles with one of said faces and intermediate surfaces of said side walls substantially spaced from said faces and having less angularity relative thereto.

4. The cutting insert of claim 3, wherein said portions each extend at a slightly acute angle relative to other of said faces.

References Cited

UNITED STATES PATENTS

| | | | |
|---|---|---|---|
| 1,838,520 | 12/1931 | Archer | 29—98 |
| 3,060,554 | 10/1962 | Kirchner | 29—96 |
| 3,142,110 | 7/1964 | Hertel | 29—96 |
| 3,284,874 | 11/1966 | Green et al. | 29—96 |
| 3,341,923 | 9/1967 | Kelm | 29—96 |

HARRISON L. HINSON, Primary Examiner

U.S. Cl. X.R.

29—95